US012706110B2

(12) United States Patent
Lee et al.

(10) Patent No.: US 12,706,110 B2
(45) Date of Patent: Aug. 11, 2026

(54) LEVERAGING SELF-SUPERVISED SPEECH REPRESENTATIONS FOR DOMAIN ADAPTATION IN SPEECH ENHANCEMENT

(71) Applicant: SAMSUNG ELECTRONICS CO., LTD., Suwon-si (KR)

(72) Inventors: Ching-Hua Lee, Mountain View, CA (US); Chouchang Yang, San Jose, CA (US); Rakshith Sharma Srinivasa, Sunnyvale, CA (US); Yashas Malur Saidutta, Menlo Park, CA (US); Jaejin Cho, Mountain View, CA (US); Yilin Shen, Mountain View, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 18/884,978

(22) Filed: Sep. 13, 2024

(65) Prior Publication Data

US 2025/0095666 A1 Mar. 20, 2025

Related U.S. Application Data

(60) Provisional application No. 63/539,487, filed on Sep. 20, 2023.

(51) Int. Cl.
*G10L 21/0208* (2013.01)
*G10L 15/06* (2013.01)
(Continued)

(52) U.S. Cl.
CPC ........ *G10L 21/0208* (2013.01); *G10L 15/063* (2013.01); *G10L 21/02* (2013.01); *G10L 21/0216* (2013.01); *G10L 2021/02166* (2013.01)

(58) Field of Classification Search
CPC ... G10L 15/063; G10L 21/0208; G10L 21/02; G10L 21/0216; G10L 2021/02166
See application file for complete search history.

(56) References Cited

U.S. PATENT DOCUMENTS

2023/0082899 A1 3/2023 Corral-Soto et al.
2024/0079022 A1* 3/2024 Li ........................ G10L 21/0208
(Continued)

FOREIGN PATENT DOCUMENTS

CN 111968666 A 11/2020
CN 113782044 A 12/2021
(Continued)

OTHER PUBLICATIONS

Hou et al., "Domain adversarial training for speech enhancement." 2019 Asia-Pacific Signal and Information Processing Association Annual Summit and Conference (APSIPA ASC). IEEE (Year: 2019).*

(Continued)

*Primary Examiner* — Samuel G Neway
(74) *Attorney, Agent, or Firm* — Sughrue Mion, PLLC

(57) ABSTRACT

A method for generating a customized speech enhancement model includes obtaining noisy-clean speech data from a source domain, obtaining noisy speech data from a target domain; obtaining raw speech data, using the noisy-clean speech data, the noisy speech data, and the raw speech data, training the customized SE model based on at least one of self-supervised representation-based adaptation (SSRA), ensemble mapping, or self-supervised adaptation loss, generating the customized SE model by denoising the noisy speech data using the trained customized SE model, and providing the customized SE model to a user device to use the denoised noisy speech data.

20 Claims, 12 Drawing Sheets

(51) Int. Cl.
*G10L 21/02* (2013.01)
*G10L 21/0216* (2013.01)

(56) References Cited

U.S. PATENT DOCUMENTS

| | | | | |
|---|---|---|---|---|
| 2024/0095514 | A1 | 3/2024 | Jin | |
| 2024/0104352 | A1 | 3/2024 | Zhang et al. | |
| 2025/0095666 | A1* | 3/2025 | Lee | G10L 15/063 |

FOREIGN PATENT DOCUMENTS

| | | | |
|---|---|---|---|
| CN | 115273856 | A | 11/2022 |
| CN | 115985335 | A | 4/2023 |
| CN | 116072108 | A | 5/2023 |
| CN | 116884395 | A | 10/2023 |
| CN | 117978595 | A | 5/2024 |
| WO | 2022/141868 | A1 | 7/2022 |
| WO | 2023/164392 | A1 | 8/2023 |
| WO | 2023/178583 | A1 | 9/2023 |

OTHER PUBLICATIONS

Wang et al., "A cross-task transfer learning approach to adapting deep speech enhancement models to unseen background noise using paired senone classifiers." ICASSP 2020-2020 IEEE International Conference on Acoustics, Speech and Signal Processing (ICASSP). IEEE (Year: 2020).*

Lin et al., "Unsupervised noise adaptive speech enhancement by discriminator-constrained optimal transport." Advances in Neural Information Processing Systems 34 (Year: 2021).*

Leglaive et al., "The CHIME-7 Udase task: Unsupervised domain adaptation for conversational speech enhancement." arXiv preprint arXiv:2307.03533 (Year: 2023).*

Chien-Feng Liao et al., "Noise Adaptive Speech Enhancement using Domain Adversarial Training", arXiv:1807.07501v3 [cs.SD], Jul. 1, 2019, 6 pages.

Chi-Chang Lee et al., "SERIL: Noise Adaptive Speech Enhancement using Regularization-based Incremental Learning", arXiv:2005.11760v2, Sep. 17, 2020, 6 pages.

Ching-Hua Lee et al., "Leveraging Self-Supervised Speech Representations for Domain Adaptation in Speech Enhancement", 2024 IEEE International Conference on Acoustics, Speech and Signal Processing (ICASSP), pp. 10831-10835, Mar. 18, 2024.

International Search Report (PCT/ISA/210) and Written Opinion (PCT/ISA/237) issued by the International Searching Authority on Jan. 6, 2025 in corresponding International Application No. PCT/KR2024/014214.

* cited by examiner

NOISE
MIC
MIC RECEIVER
210
SE SYSTEM TRAINED WITH ORIGINAL DOMAIN DATA ONLY
HUMAN EAR OR SMART ASSISTANTS

NOISE
MIC
MIC RECEIVER
230
SE SYSTEM WITH SSRA ADAPTATION
HUMAN EAR OR SMART ASSISTANTS

LEVERAGING SELF-SUPERVISED SPEECH REPRESENTATIONS FOR DOMAIN ADAPTATION IN SPEECH ENHANCEMENT

CROSS-REFERENCE TO RELATED APPLICATION

This application claims priority to U.S. provisional application No. 63/539,487 filed on Sep. 20, 2023, the entire contents of which are incorporated herein by reference.

BACKGROUND

1. Field

This disclosure relates to an electronic device and method for generating customized speech enhancement (SE) artificial intelligence (AI) model by adopting self-supervised learning (SSL) representation based on SSL similarity-based adaptation loss for soft alignment of source-target domain speech signal, in order to mitigate a performance degradation caused by a mismatch between actual user environment and development environments.

2. Description of Related Art

Voice has played a major role in human to human communication and human to machine interactions in daily living. Due to technology advancements, mobile and wearable technology has increased with users communicating with each other and/or interacting with smart assistants through various voice user interfaces driven by, e.g., automatic speech recognition (ASR), keyword spotting (KWS), etc. With emerging mobile (e.g., smartphones, tablets), wearable (e.g., smartwatches, earbuds, hearing aids), smart home appliances (e.g., ridges, vacuum cleaners) devices, voice technology is able to be enhanced and provide beneficial applications to daily lives, e.g., augmented hearing, voice control, etc. However, the surrounding noise and interference may create issues in real life surroundings. Information carried by a speech signal could be lost at the receiver side (e.g., the human ear or smart assistants) in a noisy environment, causing difficulty in voice communication. Further, the clarity of the voice degrades drastically in noisy environments. Speech enhancement (SE) techniques may mitigate the above by suppressing background noise via spectral or temporal filtering. Deep learning-based algorithms have been developed for boosting the denoising capabilities of SE systems.

However, related art deep learning-based SE approaches train the deep neural networks (DNNs) in a fully supervised manner under limited noise types and acoustic conditions, where both the noisy utterances and the corresponding clean references can be collected from a simulated or lab setup. An SE model trained on paired noisy-clean utterances collected from one environment (e.g., source domain) may fail to perform adequately in another environment (e.g., target domain) of unknown and/or unanticipated conditions. Although the target domain performance may be improved by leveraging paired data in a new domain, in reality, it is more straightforward to collect noisy data.

Effectively addressing environmental noise may improve processing technology to perform robustly in the real world. However, there are a variety of noise types and acoustic conditions, leading to the difficulty of training a universal SE model. Thus, techniques should be developed to adapt the SE model towards better performance for new conditions, e.g., in a new environment in which only noisy data can be straightforwardly collected.

SUMMARY

Disclosed is a self-supervised representation based adaptation (SSRA) framework.

According to an aspect of the disclosure, a method for generating a customized speech enhancement (SE) model, performed by at least one processor of an electronic device, includes: obtaining noisy-clean speech data from a source domain; obtaining noisy speech data from a target domain; obtaining raw speech data; using the noisy-clean speech data, the noisy speech data, and the raw speech data, training the customized SE model based on at least one of self-supervised representation-based adaptation (SSRA), ensemble mapping, or self-supervised adaptation loss; generating the customized SE model by denoising the noisy speech data using the trained customized SE model; and providing the customized SE model to a user device to use the denoised noisy speech data.

According to an aspect of the of disclosure, a server device includes: a memory storing instructions; and at least one processor, wherein the instructions, when executed by the at least one processor, cause the server device to: obtain noisy-clean speech data from a source domain; obtain noisy speech data from a target domain; obtain raw speech data; using the noisy-clean speech data, the noisy speech data, and the raw speech data, train a customized SE model based on at least one of self-supervised representation-based adaptation (SSRA), ensemble mapping, or self-supervised adaptation loss; generate the customized SE model by denoising the noisy speech data using the trained customized SE model; and provide the customized SE model to a user device to use the denoised noisy speech data.

According to an aspect of the disclosure, a non-transitory computer-readable recording medium configured to store instructions for generating a customized speech enhancement (SE) model, which, when executed by at least one processor of an electronic device, cause the at least one processor to perform a method comprising: obtaining noisy-clean speech data from a source domain; obtaining noisy speech data from a target domain; obtaining raw speech data; using the noisy-clean speech data, the noisy speech data, and the raw speech data, training the customized SE model based on at least one of self-supervised representation-based adaptation (SSRA), ensemble mapping, or self-supervised adaptation loss; generating the customized SE model by denoising the noisy speech data using the trained customized SE model; and providing the customized SE model to a user device to use the denoised noisy speech data.

BRIEF DESCRIPTION OF THE DRAWINGS

Features and/or aspects of the disclosed subject matter will be more apparent from the following detailed description and the accompanying drawings in which.

DETAILED DESCRIPTION

Figure 1:
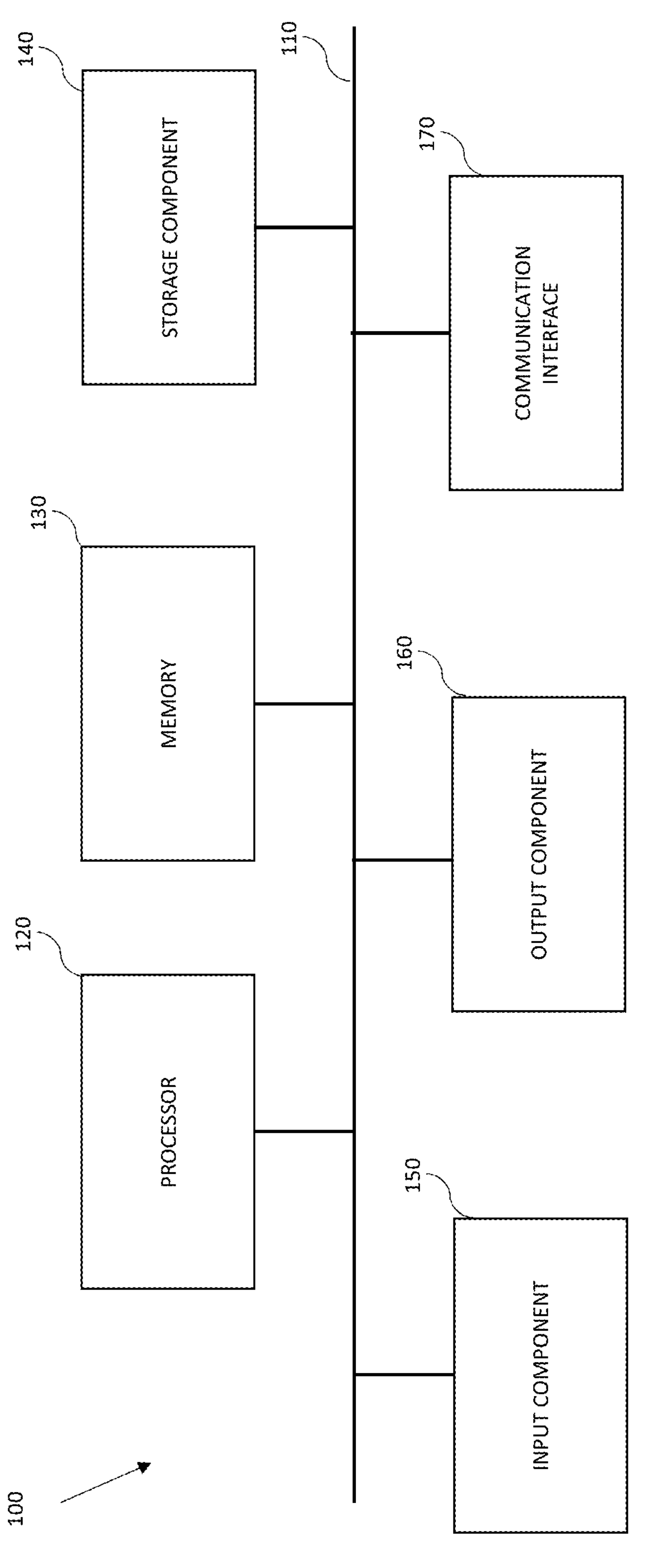
FIG. 1 is a block diagram of example components of one or more devices, in accordance with one or more embodiments of the disclosure.

The following detailed description of example embodiments refers to the accompanying drawings. The same reference numbers in different drawings may identify the same or similar elements.

The disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware or firmware. The actual specialized control hardware used to implement these systems and/or methods is not limiting of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

In SE models, an estimator $f(\cdot;\theta)$ is identified that maps a noisy utterance $X\in\mathcal{X}$ into a clean reference $y\in\mathcal{Y}$, where $\mathcal{X}$ and $\mathcal{Y}$ denote the spaces of noisy and clean speech respectively. In a source domain, noisy-clean speech pairs $$\{(x_i^S, y_i^S)\}_{i=1}^{N_S}$$

of a source domain distribution S(x, y) are available for training. In a target domain, a new domain following a distribution $\mathcal{T}(x, y)$ includes only noisy data $$\{x_i^{\mathcal{T}}\}_{i=1}^{N_{\mathcal{T}}}$$

that is accessible for training. However, a domain shift caused by unseen environments may lead to an SE model $\theta_S$ trained solely on labeled data of the source domain S to suffer from performance degradation in a target domain $\mathcal{T}$. The source domain may refer to noisy-clean speech pairs $$\{(x_i^S, y_i^S)\}_{i=1}^{N_S}$$

of a source domain distribution S(x, y) available for training. The target domain may refer to a new domain following the distribution $\mathcal{T}(x, y)$ with only noisy data $$\{x_i^{\mathcal{T}}\}_{i=1}^{N_{\mathcal{T}}}$$

accessible for training.

According to one or more embodiments, unsupervised domain adaptation techniques for SE are provided that utilize only noisy data from the new environment (e.g., target domain), together with exploiting the knowledge available from the source domain paired data, for improved SE in the new domain. Speech denoising techniques are provided with adaptability to various unknown environments, given that the SE models do not usually have enough capacity to encompass all types of acoustics and noise conditions. This enables personalization of the denoising model as the user can collect the noisy data with their own device, send the data to the developer side for updating the SE model parameters, and get the customized model back to their device for their usage.

Effectively addressing environmental noise is useful for any voice processing technology to perform robustly in the real world. However, there are a variety of noise types and acoustic conditions, leading to the difficulty of training a universal SE model. Thus, it is useful to develop efficient techniques to adapt the SE model towards better performance for the new conditions, where in the new environment only noisy data can be straightforwardly collected.

FIG. 1 is a block diagram of example components of one or more devices, in accordance with one or more embodiments of the disclosure. A device 100 may be any other suitable device such as a smartphone, tablet, wearable device (e.g., smartwatch, earbuds, hearing aid), smart home appliance (e.g., refrigerator, vacuum cleaner), TV or wall panel. As shown in FIG. 1, the device 100 may include a bus 110, a processor 120, a memory 130, a storage component 140, an input component 150, an output component 160, and a communication interface 170.

The bus 110 includes a component that permits communication among the components of the device 100. The processor 120 is implemented in hardware, firmware, or a combination of hardware and software. The processor 120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 120 includes one or more processors capable of being programmed to perform a function. The memory 130 includes a random access memory (RAM), a read only memory (ROM), and/or another type of dynamic or static storage device (e.g. a flash memory, a magnetic memory, and/or an optical memory) that stores information and/or instructions for use by the processor 120.

The storage component 140 stores information and/or software related to the operation and use of the device 100. For example, the storage component 140 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 150 includes a component that permits the device 100 to receive information, such as via user input (e.g. a touch screen display, a keyboard, a keypad, a mouse, a button, a switch, and/or a microphone). Additionally, or alternatively, the input component 150 may include a sensor for sensing information (e.g. a global positioning system (GPS) component, an accelerometer, a gyroscope, and/or an actuator). The output component 160 includes a component that provides output information from the device 100 (e.g. a display, a speaker, and/or one or more light-emitting diodes (LEDs)).

The communication interface 170 includes a transceiver-like component (e.g., a transceiver and/or a separate receiver and transmitter) that enables the device 100 to communicate with other devices, such as via a wired connection, a wireless connection, or a combination of wired and wireless connections. The communication interface 170 may permit the device 100 to receive information from another device and/or provide information to another device. For example, the communication interface 170 may include an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more processes described herein. The device 100 may perform these processes in response to the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 170. When executed, software instructions stored in the memory 130 and/or the storage component 140 may cause the processor 120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, the device 100 may include additional components, fewer components, different components, or differently arranged components than those shown in FIG. 1. Additionally, or alternatively, a set of components (e.g. one or more components) of the device 100 may perform one or more functions described as being performed by another set of components of the device 100.

Figures 2A, 2B:
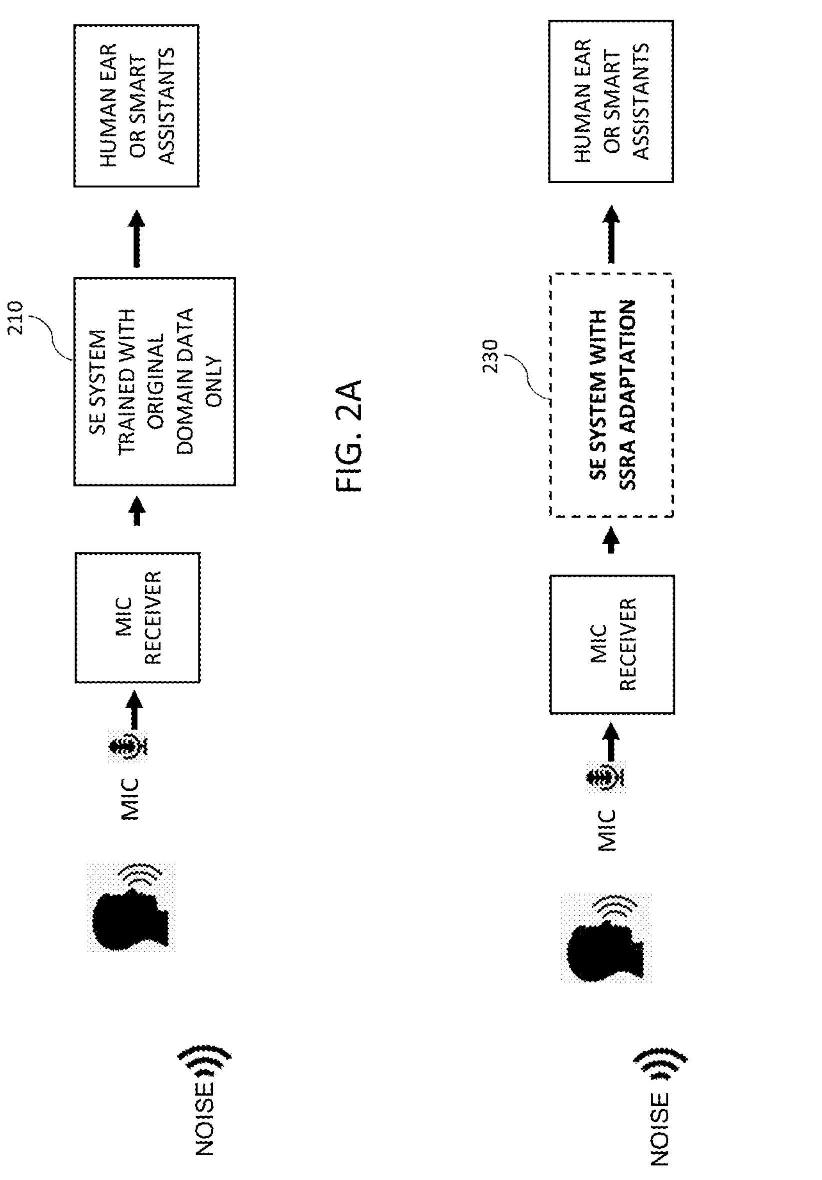
FIGS. 2A and 2B illustrate an example user environment, in accordance with one or more embodiments of the disclosure.

FIGS. 2A and 2B illustrate an example user environment, in accordance with one or more embodiments of the disclosure. FIG. 2A illustrates an SE system trained only with original domain data. A microphone receiver captures sound, including speech and background noise, by converting sound waves into electrical signals. These signals are then processed, and in systems with speech enhancement models, the signal undergoes additional steps to improve the clarity and intelligibility of the speech, particularly in noisy environments. The microphone receiver converts sound pressure waves into analog electrical signals. These signals are then digitized for further processing by the speech enhancement model. Before feeding the signal to the speech enhancement model, basic noise filtering techniques, such as high-pass or low-pass filtering, may be applied to remove irrelevant frequencies and reduce environmental noise. In related art, as illustrated in step 210 of FIG. 2A, SE systems may be trained with original domain data only. In training with original domain data only, where both the noisy utterances and the corresponding clean references can be collected from a simulated or lab setup, an SE model trained on paired noisy-clean utterances collected from one environment (e.g., source domain) may fail to perform adequately in another environment (e.g., target domain) of unseen conditions.

As illustrated in step 230 of FIG. 2B, the speech enhancement may be improved for a user in a new unknown domain (e.g., target domain). For example, as illustrated in FIG. 2B, the microphone receiver feeds a signal to an SE system that uses a self-supervised representation based adaptation (SSRA) framework, according to an embodiment. In this way, the SE system improves the target domain performance by using noisy data in the target domain together with exploiting the knowledge available from the source domain paired data.

Figure 3:
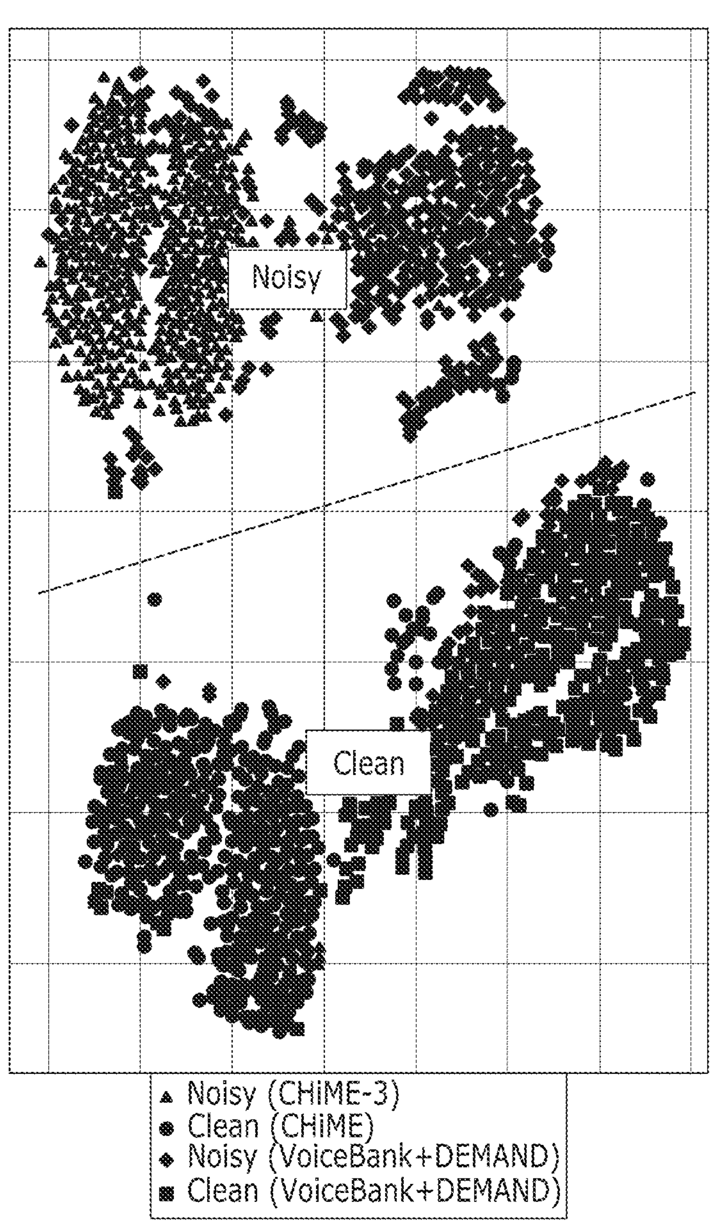
FIG. 3 illustrates an example diagram of noisy training data and clean training data, in accordance with one or more embodiments of the disclosure.

FIG. 3 illustrates an example diagram of noisy training data and clean training data, in accordance with one or more embodiments of the disclosure. As illustrated in FIG. 3, the noisy and clean data are well-separated in an SSL latent space. In SSL models for SE, much of the noisy and clean speech can be highly distinguishable in the SSL latent space, which may be useful for performing SE. As illustrated in FIG. 3, an SSL model is used to encode noisy and clean utterances from two public datasets, CHIME-3 and VoiceBank+DEMAND. CHIME-3 is a speech dataset designed for speech recognition in noisy environments. VoiceBank is a dataset of speech samples from multiple speakers, typically recorded in quiet, controlled environments. The VoiceBank corpus is often used as a "clean" speech reference in speech enhancement research. The DEMAND dataset contains environmental noise recordings captured in real-world settings. An efficient domain adaptation technique for SE systems may be used by leveraging SSL-based speech representations. The SSL speech models may be pre-trained with a large amount of raw speech data which extract rich phonetic and acoustics information. As illustrated in FIG. 3, the SSL-based speech representations include clear separability of clean and noisy utterances.

Figure 4A:
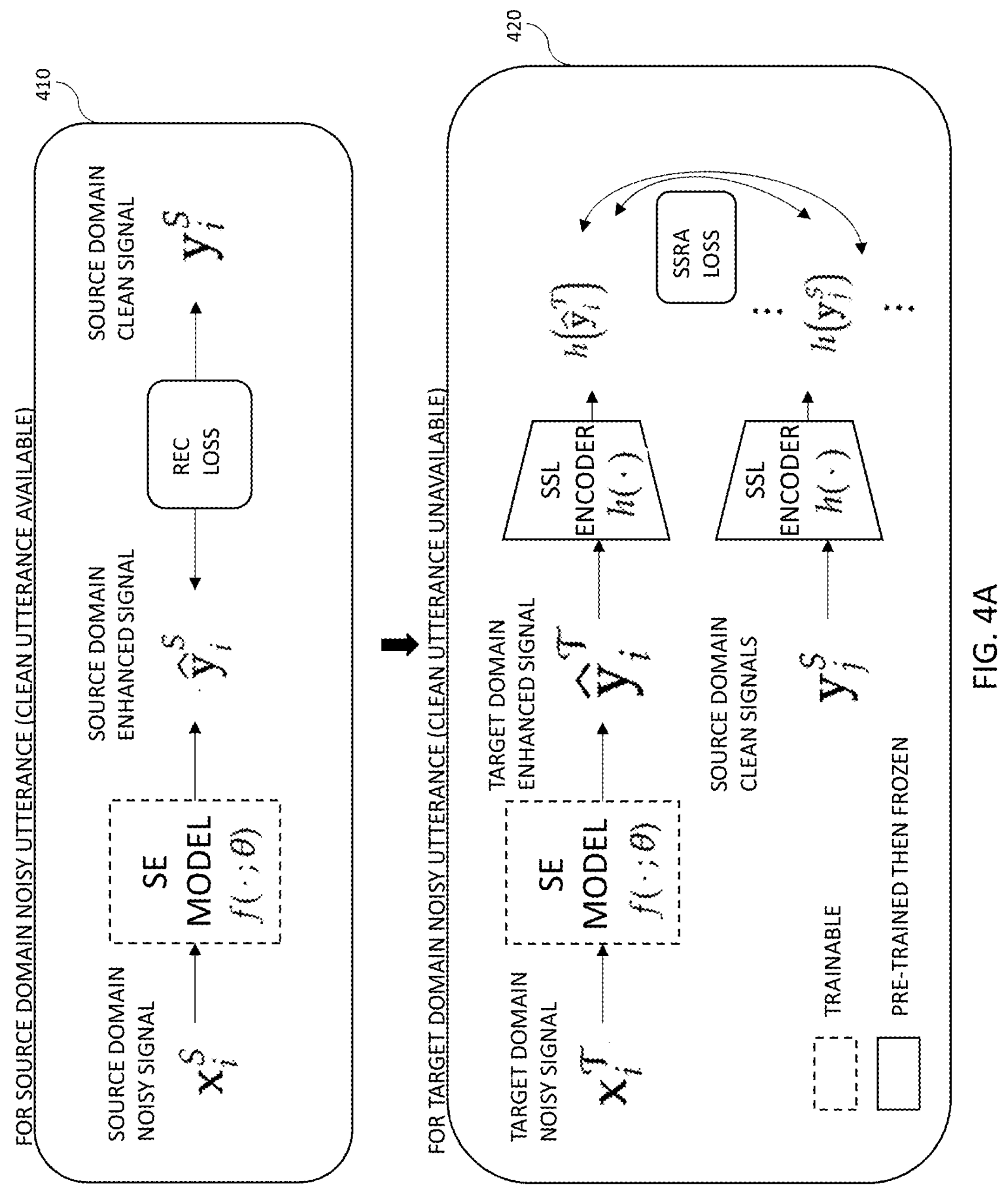
FIG. 4A illustrates an example diagram of an SSRA framework, in accordance with one or more embodiments of the disclosure.

FIG. 4A illustrates an example diagram of an SSRA framework, in accordance with one or more embodiments of the disclosure. One or more example embodiments provide for the deployment of an SE model to a new environment by collecting noisy training data from that environment, and minimizing reconstruction loss (e.g., rec loss) for a source domain noisy utterance and minimizing SSRA loss for a target domain noisy utterance. In the context of speech enhancement, reconstruction loss may refer to a difference between an original (e.g., clean) speech signal and a reconstructed (e.g., enhanced) speech signal produced by a model. Related art methods that only train an SE model on source domain may fail to perform adequately in new noise and acoustic environments.

In accordance with an embodiment of the disclosure, using training data of a source domain $$\{(x_i^S, y_i^S)\}_{i=1}^{N_S}$$

and a target domain $$\{x_i^{\mathcal{T}}\}_{i=1}^{N_{\mathcal{T}}},$$

the SSRA framework obtains a parameter set θ for the SE model f(•; θ) by the following equation:

$$\min_\theta \mathcal{L}_{rec} + \mathcal{L}_{ssra} = \min_\theta \underbrace{\frac{1}{N_S}\sum_{i=1}^{N_S} D_1\left(f\left(x_i^S;\theta\right), y_i^S\right)}_{\mathcal{L}_{rec}:\ Rec\ Loss} + \underbrace{\frac{\lambda}{N_S N_{\mathcal{T}}}\sum_{i=1}^{N_{\mathcal{T}}}\sum_{j=1}^{N_S} w_{ij} D_2\left(h\left(f\left(x_i^{\mathcal{T}};\theta\right)\right), h\left(y_j^S\right)\right)}_{\mathcal{L}_{ssra}:\ SSRA\ Loss}, \quad (1)$$

In the above equation, $D_1(\bullet,\bullet)$ and $D_2(\bullet,\bullet)$ may refer to distance measures and λ>0 for weighting the two loss terms, Rec Loss and SSRA Loss. The SE model may be trained to minimize or converge the overall loss, which is the sum of the Rec Loss and the SSRA Loss.

In accordance with an embodiment, as illustrated in block 410 in FIG. 4A, a source domain noisy signal $$x_i^S$$

is provided to an SE model f(•; θ), which produces a source domain enhanced signal $$\hat{y}_i^S.$$

In obtaining a source domain clean signal $$y_i^S,$$

there is a S reconstruction loss. A source domain clean signal may refer to a type of signal (e.g., audio or speech) in which the signal comes from a known or original "source domain" (e.g., the environment or dataset in which the signal was originally generated) and is free from noise, interference, or distortion. The SE model, according to an embodiment, is trained to minimize a reconstruction loss in accordance with equation (1) above.

In addition to minimizing reconstruction loss, according to an embodiment illustrated in block 420, SSRA loss may be minimized by obtaining actual noisy data in a target domain. The process may include obtaining a target domain noisy signal $x_i^{\mathcal{T}}$ and providing the target domain noisy signal to the SE model f(•; θ). The SE model f(•; θ) produces a target domain enhanced signal $\hat{y}_i^{\mathcal{T}}$, which is provided to an SSL encoder h(•) The SSL encoder transforms the target domain enhanced signal into an SSL representation $h(\hat{y}_i^{\mathcal{T}})$. Additionally, source domain clean signals $$y_j^S$$

are provided to an SSL encoder h(•), which produces an SSL representation $$h(y_j^S).$$

According to an embodiment, multiple clean utterances from the source domain are used to guide the SE model through the SSRA loss.

Figure 4B:
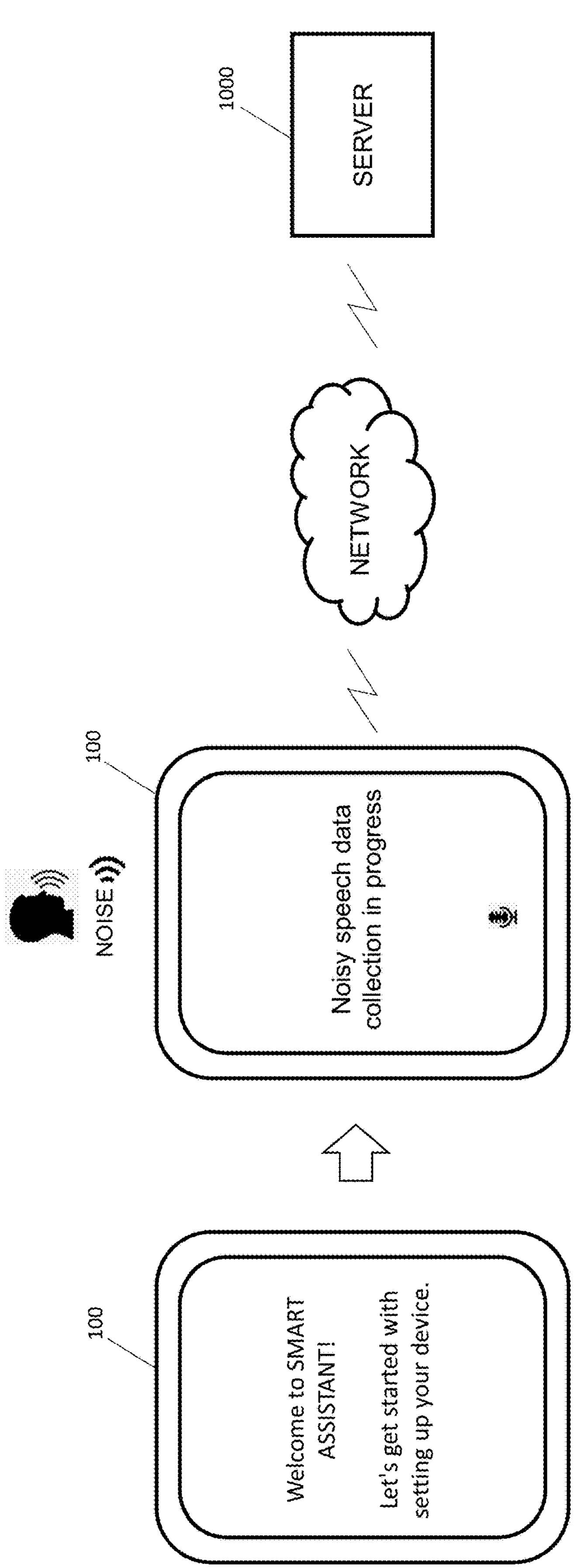
FIG. 4B illustrates an example diagram of a terminal device, in accordance with one or more embodiments of the disclosure.

FIG. 4B illustrates an example diagram of a terminal device configured to operate the SSRA framework, in accordance with one or more embodiments of the disclosure. The terminal device in FIG. 4B may correspond to the device 100 shown in FIG. 1. The terminal device 100 may customize the SE model in a real-world environment (e.g., the target domain) where the user operates the terminal device 100.

When the terminal device 100 activates a smart assistance or speech recognition function, it may collect noisy speech data to set up or configure these functions. The terminal device 100 may either include the SSRA framework directly or interact with it through a server 1000 including the SSRA framework, to adapt the SSRA framework based on the noisy speed data collected from the user's own terminal device 100.

In accordance with an embodiment, the SSRA framework of the disclosure uses SSL representations for guiding SE model adaptation to the target domain, based on the useful properties of SSL including good separability of clean noisy speech in the SSL space and rich acoustic and phonetic information in SSL representations. In the SSRA framework according to the embodiments, the SSL encoder h(•) is utilized only during training and does not increase a complexity in inference time.

Figure 5:
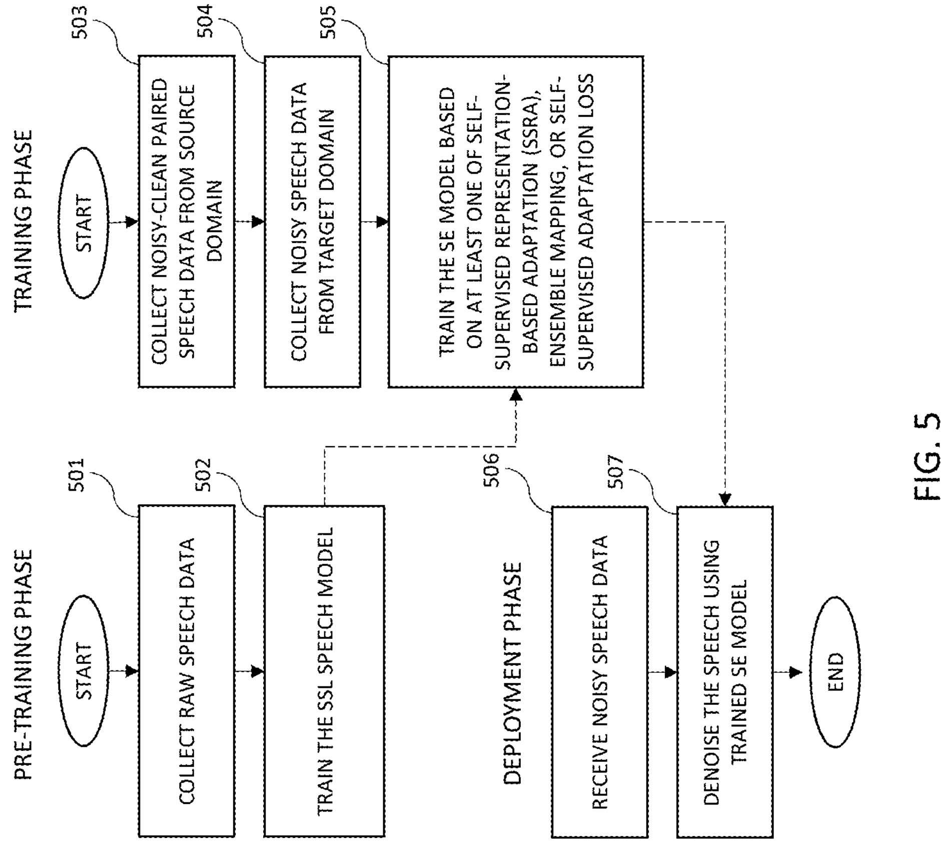
FIG. 5 illustrates an example process for generating a customized speech enhancement (SE) artificial intelligence (AI) model, in accordance with one or more embodiments of the disclosure.

FIG. 5 illustrates an example process for generating a customized speech enhancement (SE) artificial intelligence (AI) model, in accordance with one or more embodiments of the disclosure.

As illustrated in FIG. 5, according to an embodiment there is a pre-training phase and a training phase. In the pre-training phase, raw speech data are collected for obtaining self-supervised learning (SSL) based speech representations at a block 501. Raw speech data may refer to audio recordings of human speech that have not been processed or modified for any specific task. This data may include natural speech captured from various sources like conversations, lectures, interviews, podcasts, or any other spoken communication. The collection of raw speech data may be performed by collecting large amounts of unlabeled speech from many sources, e.g., the internet. Next, the data are used to train the SSL model at a block 502. According to one or more embodiments, publicly available SSL pre-trained speech models may be used instead of pre-training.

In the training phase, noisy and clean speech pairs (e.g., noisy-clean speech data) may be collected from a source domain (e.g., a simulated or lab environment) at block 503. Noisy speech samples (e.g., noisy speech data) may be collected from a target domain (e.g., actual environments for deployment) at a block 504. As an example, a user may collect noisy speech data from their user device and send the collected data to a server device (e.g., cloud server). Clean speech data may refer to a speech data in which the signal comes from a known or original "source domain" (e.g., the environment or dataset in which the signal was originally generated) and is free from noise, interference, or distortion. The SE model is trained by using an SSRA framework with source domain paired data, target domain unpaired data, and the SSL pre-trained model at a block 505.

The SE model may be trained at block 505 based on at least one of a self-supervised representation-based adaptation (SSRA) framework, an ensemble mapping, or self-supervised adaptation loss. The SSRA framework, ensemble mapping, and the self-supervised adaptation loss will be described in more detail below with respect to FIGS. 6-9.

In a deployment phase, noisy audio streams are received by a microphone device at a block 506. Denoising is performed using the trained SE model to enhance the noisy speech at a block 507. The deployment phase may be performed at a user device (e.g., a mobile device, a. For example, a user may download an adapted SE model customized to the current environment in order to obtain improved denoising performance at the user device.

Figure 6:
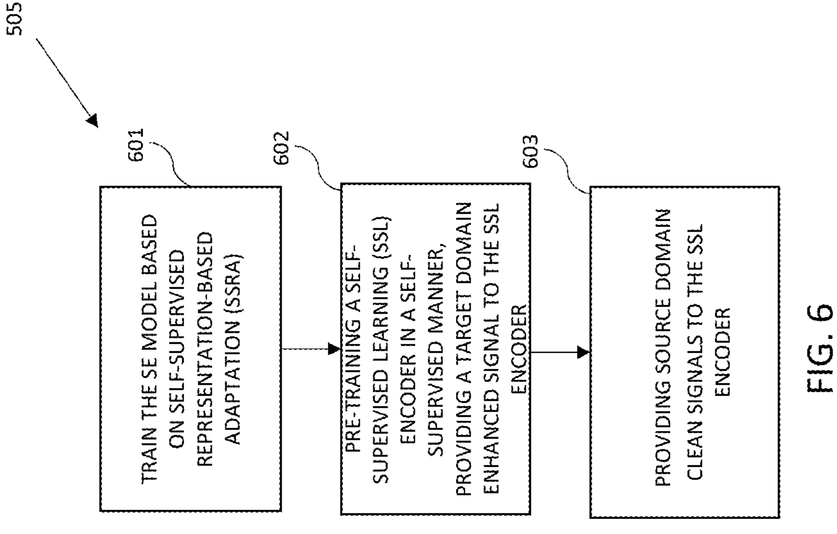
FIG. 6 illustrates an example process for generating a customized SE AI model, in accordance with one or more embodiments of the disclosure.

FIG. 6 illustrates an example process using an SSRA framework for generating a customized SE AI model as described in block 505 above, in accordance with one or more embodiments of the disclosure. For example, as illustrated at block 601, the SE model may be trained based on an SSRA framework. As illustrated at block 602, training the SE model according to an embodiment includes pre-training a self-supervised learning (SSL) encoder in a self-supervised manner and providing a target domain enhanced signal to the SSL encoder. The SSL encoder may be pre-trained with raw speech data in a self-supervised manner, requiring no data labeling effort, and thus can be scaled up to a large amount of training data. Further, as illustrated in block 603, the process may include providing source domain clean signals to the SSL encoder. The SSRA framework may be similar to the process described above with respect to equation (1). For example, the SSRA framework may use training data of a source domain, $$\{(x_i^S, y_i^S)\}_{i=1}^{N_S}$$

and a target domain $$\{x_i^{\mathcal{T}}\}_{i=1}^{N_{\mathcal{T}}},$$

the SSRA framework obtains a parameter set θ for the SE model f(•; θ) by using equation (1) above.

Figure 7:
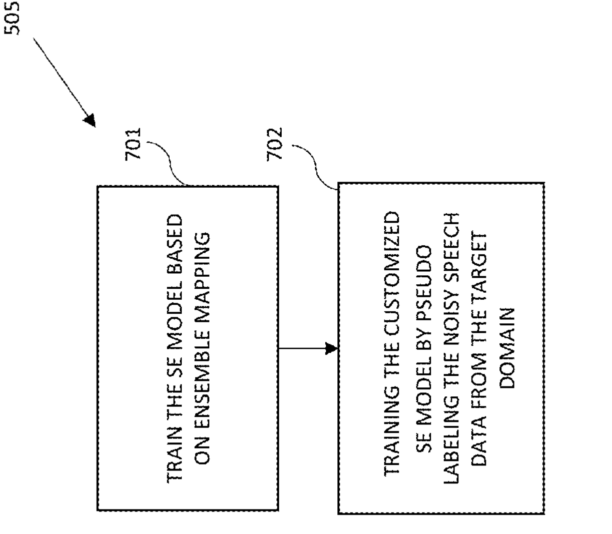
FIG. 7 illustrates an example process for generating a customized SE AI model, in accordance with one or more embodiments of the disclosure.

FIG. 7 illustrates an example process using ensemble mapping for generating a customized SE AI model as described in block 505 above, in accordance with one or more embodiments of the disclosure. For example, as illustrated at block 701, the SE model may be trained based on ensemble mapping. The ensemble mapping may include, as illustrated at block 702, training the customized SE model by pseudo labeling the noisy speech data from the target domain. An example of the ensemble mapping process is described below with respect to FIG. 8.

Figure 8:
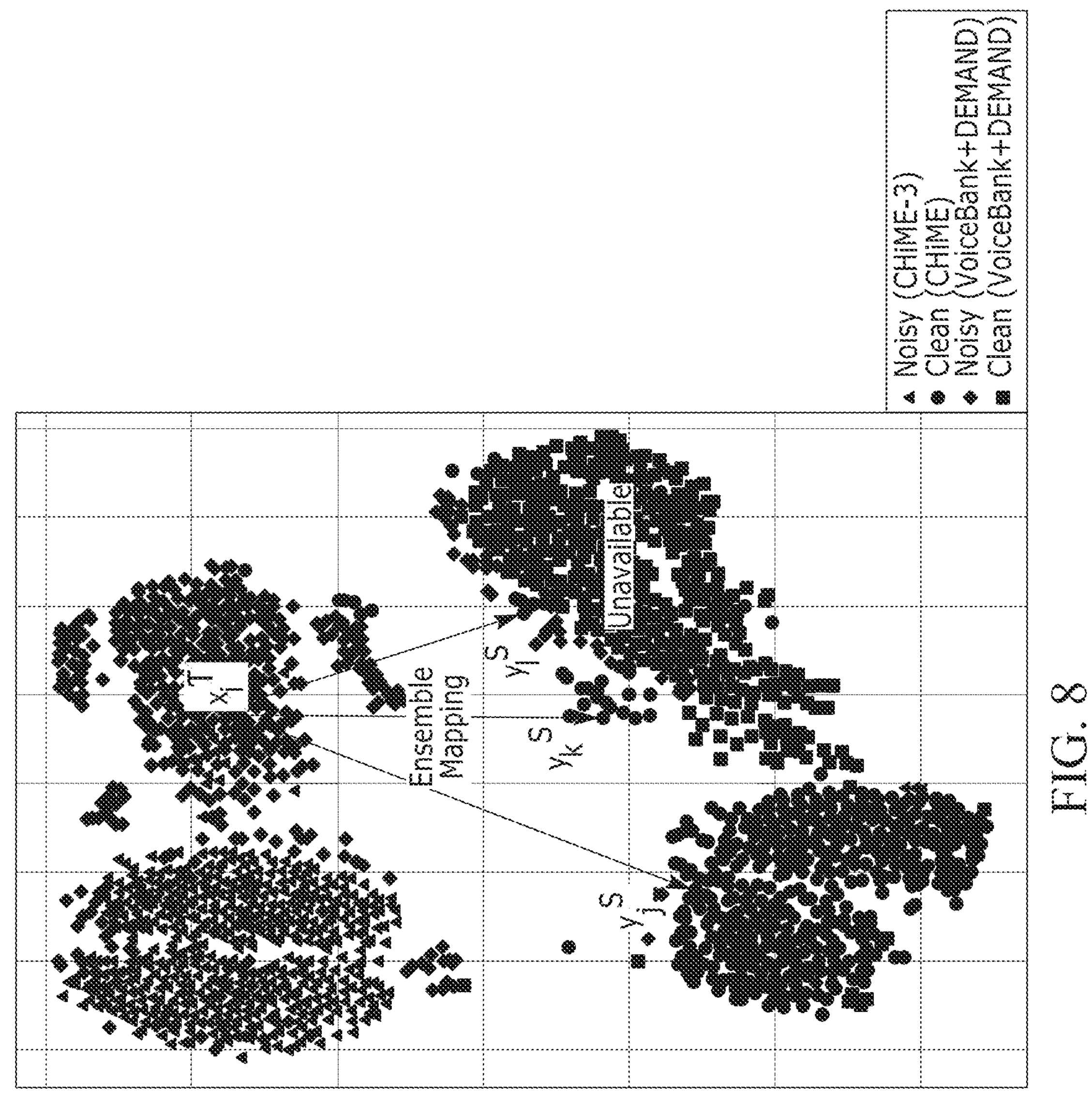
FIG. 8 illustrates an example of ensemble mapping for pseudo labeling of unpaired noisy data, in accordance with one or more embodiments of the disclosure.
Figure 8:
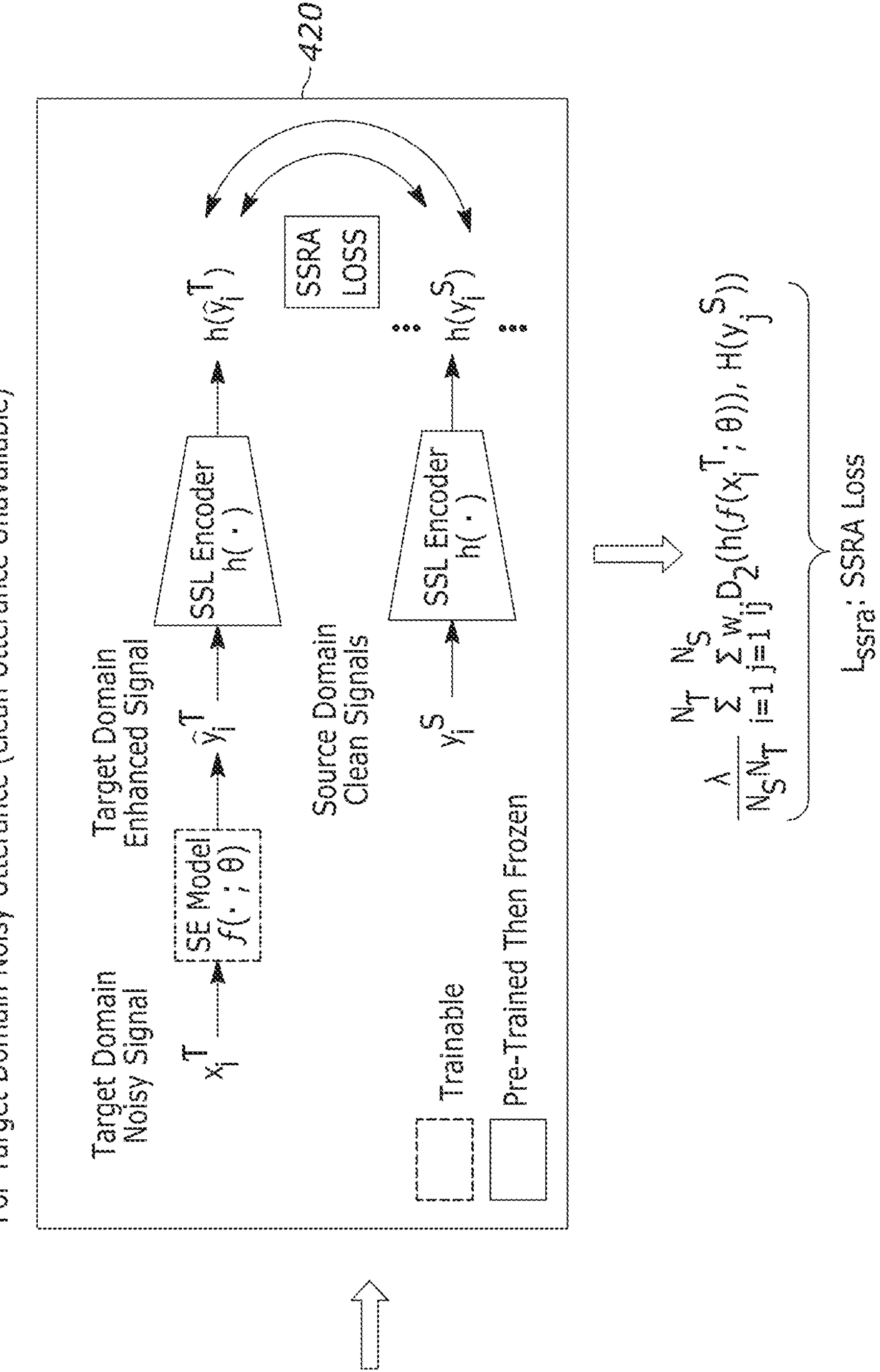

FIG. 8 illustrates an example of ensemble mapping for pseudo labeling of unpaired noisy data, in accordance with one or more embodiments of the disclosure. For example, when clean data of a target domain (e.g., VoiceBank+DEMAND) are not available (e.g., unavailable portion in FIG. 8), the exact noisy-clean mapping for SE model training may be approximated through ensemble mapping, i.e., mapping the noisy sample into clean speech by using multiple source domain (e.g., CHiME-3) clean samples. As an example illustrated in FIG. 8, for a target domain noisy sample $x_i^{\mathcal{T}}$, because the corresponding clean speech $y_i^{\mathcal{T}}$ is not available, multiple clean utterances $$y_j^S, y_k^S, y_l^S$$

may be used from a source domain to guide the SE model learning through the SSRA Loss. The top portion of FIG. 8 (Continued) is similar to block 420 in FIG. 4A. For example, the clean utterances $$y_j^S, y_k^S, y_l^S$$

are used as the source domain clean signals and are provided to an SSL encoder, which transforms the signals into SSL representations (e.g., $$h(y_j^S)).$$

The SSL representations $$h(y_j^S)$$

are aligned with the SSL representations $h(\hat{y}_i^{\mathcal{T}})$ produced by the SSL encoder at the top of block 420, in order to minimize the SSRA loss, which is illustrated at the bottom portion of FIG. 8 (Continued). The SSRA loss equation at the bottom of FIG. 8 (Continued) is similar to the SSRA loss in equation (1) above.

Figure 9:
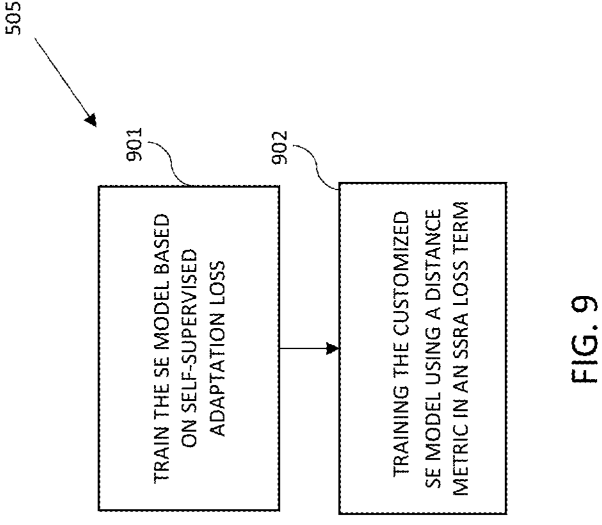
FIG. 9 illustrates an example process for generating a customized SE AI model, in accordance with one or more embodiments of the disclosure.

FIG. 9 illustrates an example process using self-supervised adaptation loss for generating a customized SE AI model, in accordance with one or more embodiments of the disclosure. For example, as illustrated at block 901, the SE model may be trained based on self-supervised adaptation loss. The self-supervised adaptation loss may include, as illustrated at block 902, training the customized SE model using a distance metric in an SSRA loss term. According to an embodiment, an SSL similarity-based adaptation loss for soft alignment of source-target domain pairing may be used to account for the variety of speech samples. For example, according to an embodiment, the distance metric $D_2(\bullet,\bullet)$ in the SSRA loss term of (1) which is usually used for contrasting embeddings—the negative cosine similarity, imposed on temporally averaged SSL representations as illustrated in equation (2) below:

$$D_2(h(f(x_i^{\mathcal{T}};\theta)), h(y_j^S)) = -\cos sim(\overline{h}(f(x_i^{\mathcal{T}};\theta)), \overline{h}(y_j^S)), \quad \text{where } \cos sim(a, b) = a^T b/\|a\|\|b\| \tag{2}$$

is the cosine similarity of two vectors a and b, and $\hat{h}(\bullet)$ stands for the averaged SSL representation over time frames. By using negative cosine similarity, the two representations are aligned in a softer manner rather than strictly forcing them to be frame-wise identical, because an exact noisy-clean mapping from two different domains may be unlikely. Further, the weighting term $w_{ij}$, defined in equation (3) below:

$$w_{ij} = 0.5 * (\cos sim(\overline{h}(x_i^{\mathcal{T}}), \overline{h}(x_j^S)) + 1). \tag{3}$$

The above equation may be used for weighting the computed distance of each {i,j} pair in equation (2) above for the SSRA loss in equation (1) above. The value of $w_{ij}$ is between [0,1] and is proportional to the similarity between the time-averaged SSL representations of the i-th target domain noisy utterance and the j-th source domain noisy utterance. According to an embodiment, if the target domain noisy sample $x_i^{\mathcal{T}}$ is similar to the source domain noisy sample $$x_i^S,$$

then a larger weight should be assigned to equation (2) as it may approximate a true noisy-to-clean mapping.

Figure 10A:
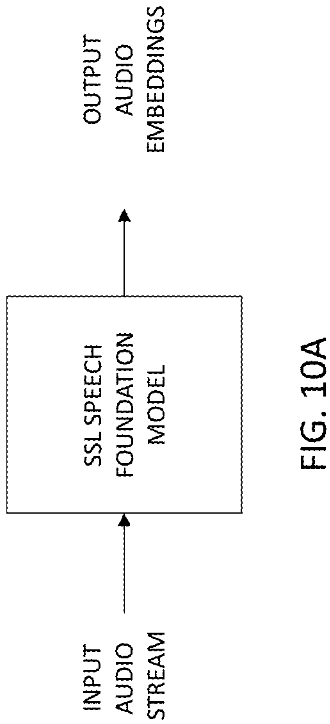
FIGS. 10A and 10B illustrate example SSRA framework adaptations, in accordance with one or more embodiments of the disclosure.
Figure 10B:
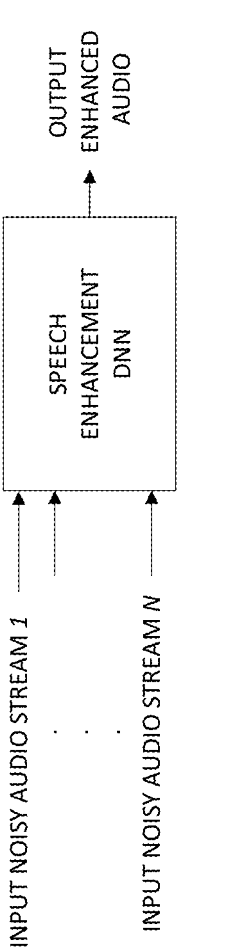

FIGS. 10A and 10B illustrate example SSRA framework adaptations, in accordance with one or more embodiments of the disclosure. FIG. 10A illustrates an input audio stream provided to an SSL speech foundation model that outputs audio embeddings. The SSL speech foundation model may adopt one or more pre-trained speech foundation models for SSL representations (e.g., wav2vec, HuBERT, wavLM, etc.). The SSRA framework discussed above with respect to the one or more embodiments may adopt any SSL pre-trained speech models.

As illustrated in FIGS. 10A and 10B, the SSRA framework discussed above with respect to FIGS. 4-9 may be applied to any DNN architecture of the SE model. The SSRA framework may be used for multiple microphone devices, e.g., input noisy audio streams 1 to N.

According to one or more embodiments, the SSRA framework may be used to perform speech and audio denoising on numerous edge devices and mobile platforms with microphones. A non-exhaustive list of devices may include refrigerators, cell phones, vacuum cleaners, smart watches, AR/VR glasses, earbuds, smart TVs, etc. The one or more embodiments may be used as a pre-processing unit for voice control, automatic speech recognition (ASR), audio anomaly detection, acoustic scene classification, and for assistive listening devices to improve human hearing experiences in noisy environments. Thus, the one or more embodiments may be beneficial for various intelligent applications.

While the one or more embodiments of the disclosure have been described with reference to the figures, it will be understood by those of ordinary skill in the art that various changes in form and details may be made therein without departing from the spirit and scope as defined by the following claims.

What is claimed is:

1. A method for generating a customized speech enhancement (SE) model, performed by at least one processor of an electronic device, the method comprising:

obtaining noisy-clean speech data from a source domain;

obtaining noisy speech data from a target domain;

obtaining raw speech data;

using the noisy-clean speech data, the noisy speech data, and the raw speech data, training the customized SE model based on at least one of self-supervised representation-based adaptation (SSRA), ensemble mapping, or self-supervised adaptation loss;

generating the customized SE model by denoising the noisy speech data using the trained customized SE model; and providing the customized SE model to a user device to use the denoised noisy speech data.

2. The method of claim 1, wherein the training the customized SE model comprises training the customized SE model based on the SSRA, and the training the customized SE model further comprises pre-training a self-supervised learning (SSL) encoder in a self-supervised manner, providing a target domain enhanced signal to the SSL encoder, and providing source domain clean signals to the SSL encoder.

3. The method of claim 1, wherein the training the customized SE model comprises training the customized SE model based on the ensemble mapping, and the training the customized SE model further comprises pseudo labeling the noisy speech data from the target domain.

4. The method of claim 1, wherein the training the customized SE model comprises training the customized SE model based on the self-supervised adaptation loss, and the training the customized SE model further comprises using a distance metric in an SSRA loss term.

5. The method of claim 1, wherein the noisy speech data is obtained from the user device in the target domain.

6. The method of claim 5, wherein the user device comprises at least one of a mobile phone, a refrigerator, a smart watch, glasses, or a television.

7. The method of claim 1, wherein the noisy speech data is obtained from a plurality of microphones corresponding to a plurality of user devices.

8. A server device comprising:

a memory storing instructions; and at least one processor, wherein the instructions, when executed by the at least one processor, cause the server device to:

obtain noisy-clean speech data from a source domain;

obtain noisy speech data from a target domain;

obtain raw speech data;

using the noisy-clean speech data, the noisy speech data, and the raw speech data, train a customized SE model based on at least one of self-supervised representation-based adaptation (SSRA), ensemble mapping, or self-supervised adaptation loss;

generate the customized SE model by denoising the noisy speech data using the trained customized SE model; and provide the customized SE model to a user device to use the denoised noisy speech data.

9. The server device of claim 8, wherein the instructions, when executed by the at least one processor, cause the server device to pre-train a self-supervised learning (SSL) encoder in a self-supervised manner, provide a target domain enhanced signal to the SSL encoder, and provide source domain clean signals to the SSL encoder.

10. The server device of claim 8, wherein the instructions, when executed by the at least one processor, cause the server device to train the customized SE model based on the ensemble mapping, and pseudo label the noisy speech data from the target domain.

11. The server device of claim 8, wherein the instructions, when executed by the at least one processor, cause the server device to train the customized SE model based on the self-supervised adaptation loss, and use a distance metric in an SSRA loss term.

12. The server device of claim 8, wherein the noisy speech data is obtained from the user device in the target domain.

13. The server device of claim 12, wherein the user device comprises at least one of a mobile phone, a refrigerator, a smart watch, glasses, or a television.

14. The server device of claim 8, wherein the noisy speech data is obtained from a plurality of microphones corresponding to a plurality of user devices.

15. A non-transitory computer-readable recording medium configured to store instructions for generating a customized speech enhancement (SE) model, which, when executed by at least one processor of an electronic device, cause the at least one processor to perform a method comprising:

obtaining noisy-clean speech data from a source domain;

obtaining noisy speech data from a target domain;

obtaining raw speech data;

using the noisy-clean speech data, the noisy speech data, and the raw speech data, training the customized SE model based on at least one of self-supervised representation-based adaptation (SSRA), ensemble mapping, or self-supervised adaptation loss;

generating the customized SE model by denoising the noisy speech data using the trained customized SE model; and providing the customized SE model to a user device to use the denoised noisy speech data.

16. The non-transitory computer-readable recording medium of claim 15, wherein the training the customized SE model comprises training the customized SE model based on the SSRA, and the training the customized SE model further comprises pre-training a self-supervised learning (SSL) encoder in a self-supervised manner, providing a target domain enhanced signal to the SSL encoder, and providing source domain clean signals to the SSL encoder.

17. The non-transitory computer-readable recording medium of claim 15, wherein the training the customized SE model comprises training the customized SE model based on the ensemble mapping, and the training the customized SE model further comprises pseudo labeling the noisy speech data from the target domain.

18. The non-transitory computer-readable recording medium of claim 15, wherein the training the customized SE model comprises training the customized SE model based on the self-supervised adaptation loss, and the training the customized SE model further comprises using a distance metric in an SSRA loss term.

19. The non-transitory computer-readable recording medium of claim 15, wherein the noisy speech data is obtained from the user device in the target domain.

20. The non-transitory computer-readable recording medium of claim 19, wherein the user device comprises at least one of a mobile phone, a refrigerator, a smart watch, glasses, or a television.

* * * * *